(12) United States Patent
Binion et al.

(10) Patent No.: US 10,366,370 B1
(45) Date of Patent: Jul. 30, 2019

(54) SYSTEMS AND METHODS FOR MANAGING AND COMMUNICATING VEHICLE NOTIFICATIONS FOR VARIOUS CIRCUMSTANCES

(71) Applicant: STATE FARM MUTUAL AUTOMOBILE INSURANCE COMPANY, Bloomington, IL (US)

(72) Inventors: Todd Binion, Bloomington, IL (US); Andrea Lee Rhoades, Atlanta, IL (US); Steven C. Cielocha, Bloomington, IL (US); Jessica Shull, Bloomington, IL (US); Brian Mark Fields, Normal, IL (US); Wayne Louis Cecil, Bloomington, IL (US); Steven Schmidt, Bloomington, IL (US); Ronny S. Bryant, Bloomington, IL (US); Ed Weidmann, Bloomington, IL (US); Gregory Hayward, Bloomington, IL (US); Stacey Gorsuch, Bloomington, IL (US); John Anthony Argenziano, Bloomington, IL (US); Carol Marie Csanda, Normal, IL (US); Catherine Sue Schwamberger, Folsom, CA (US); Courtney Clarke, Bloomington, IL (US); Christina P. Mullen, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/451,059

(22) Filed: Aug. 4, 2014

Related U.S. Application Data

(60) Provisional application No. 62/011,544, filed on Jun. 12, 2014.

(51) Int. Cl.
*G06Q 10/00* (2012.01)
*G07C 5/00* (2006.01)
(Continued)

(52) U.S. Cl.
CPC .......... *G06Q 10/20* (2013.01); *G06Q 30/014* (2013.01); *G06Q 40/08* (2013.01); *G07C 5/008* (2013.01)

(58) Field of Classification Search
CPC ......... G01C 21/26; G07C 5/008; G07C 5/085
(Continued)

(56) References Cited

U.S. PATENT DOCUMENTS

| 6,927,682 B1 * | 8/2005 | Touhey et al. ............. 340/457.4 |
| 2002/0016655 A1 * | 2/2002 | Joao ................................ 701/35 |

(Continued)

OTHER PUBLICATIONS progressive.com, "Vehicle Recall Search," (1995-2014). Retrieved from the Internet on Aug. 11, 2014: http://www.progressive.com/vehicle-resources/vehicle-recall-search/.

(Continued)

*Primary Examiner* — Kimberly S Berona
*Assistant Examiner* — Rodney P King
(74) *Attorney, Agent, or Firm* — Marshall, Gerstein & Borun LLP; Randall G. Rueth

(57) ABSTRACT

Methods and systems for retrieving and compiling vehicle information from a variety of sources, and assessing circumstances or events based upon the vehicle information. A central entity, such as an insurance provider, may receive the vehicle information and avail information related to a plurality of vehicles to vehicle owners or operators in a single source dashboard. The central entity may assess the vehicle circumstances to determine whether to notify the individuals of an event, such as a vehicle recall or upcoming maintenance, and then generate notifications and communicate the notifications to the individuals. The notifications may enable the individuals to take maintenance, repair, update, and/or other actions to manage the circumstances and potentially avoid situations that may cause unnecessary financial commitments or vehicle damage. The insurance provider may (Continued)

adjust auto insurance premiums, discounts, rewards, or rebates based upon the type or usage of the dashboard functionality utilized by an insured.

9 Claims, 6 Drawing Sheets

(51) Int. Cl.
*G06Q 40/08* (2012.01)
*G06Q 30/00* (2012.01)

(58) Field of Classification Search
USPC ............... 701/1, 29.4, 31.4, 32.5, 117, 118; 340/5.82, 457.4, 686.6
See application file for complete search history.

(56) References Cited

U.S. PATENT DOCUMENTS

| | | | |
|---|---|---|---|
| 2002/0065825 A1* | 5/2002 | Kassan | G06Q 10/06 |
| 2003/0107548 A1* | 6/2003 | Eun et al. | 345/156 |
| 2004/0022416 A1* | 2/2004 | Lemelson et al. | 382/104 |
| 2004/0203974 A1* | 10/2004 | Seibel | 455/517 |
| 2005/0060067 A1* | 3/2005 | Nishida | B60R 16/0231 701/2 |
| 2005/0125117 A1* | 6/2005 | Breed | G07C 5/008 701/31.5 |
| 2007/0179860 A1* | 8/2007 | Romero | 705/26 |
| 2009/0295537 A1* | 12/2009 | Lane et al. | 340/5.82 |
| 2012/0123611 A1* | 5/2012 | Grasso et al. | 701/1 |
| 2013/0151065 A1* | 6/2013 | Ricci | G06F 9/54 701/31.4 |
| 2014/0165159 A1* | 6/2014 | Baade | H04L 63/08 726/4 |

OTHER PUBLICATIONS blog.allstate.com, "How to Avoid Buying a Car with a Safety Recall," (Apr. 10, 2013). Retrieved from the Internet on Aug. 11, 2014: http://blog.allstate.com/how-to-avoid-buying-a-car-with-a-safety-recall/.

carfax.com, "Free CARFAX Recall Check." Retrieved form the Internet on Aug. 11, 2014: http://www.carfax.com/recall_check.cfx.

* cited by examiner

SYSTEMS AND METHODS FOR MANAGING AND COMMUNICATING VEHICLE NOTIFICATIONS FOR VARIOUS CIRCUMSTANCES

CROSS-REFERENCE TO RELATED APPLICATIONS

This application claims the benefit of U.S. Provisional Application No. 62/011,544, filed Jun. 12, 2014, which is incorporated by reference herein in its entirety.

FIELD OF THE DISCLOSURE

The present disclosure generally relates to managing and communicating notifications regarding various types of equipment, such as vehicles, appliances, etc. More particularly, the present disclosure may relate to enabling central management of various equipment information from a plurality of sources where the equipment information relates to various circumstances or recall events.

BACKGROUND

There is a wide variety of information related to vehicles on the road today that is available via a variety of communication channels or sources. In particular, a lot of the information is related to the care, maintenance, and service of vehicles. For example, the information may include recall notices, service bulletins, service or maintenance schedules, vehicle health reports, and general vehicle usage data. The information is important, if not necessary, for vehicle owners to assess in order to ensure proper care and service of their vehicles and to thus avoid unnecessary breakdowns and financial commitments.

However, the channels that vehicle owners use to access some of this information prove time consuming and burdensome for the vehicle owners. For example, to determine and assess certain vehicle information, vehicle owners have to explicitly access various sources such as government or automobile manufacturer websites. Further, vehicle owners may have to rely on physical mailings from automobile manufacturers that notify of recalls, which may or may not apply to the vehicle owner's current vehicle. As an additional example, vehicle owners may have to manually keep track of certain service appointments and maintenance schedules, such as those associated with oil changes, brake repair, and the like.

The present embodiments may, inter alia, alleviate these burdensome, time consuming, inefficient, and ineffective channels, and/or alleviate other drawbacks.

SUMMARY

The present embodiments may maintain a single-source solution to manage certain equipment information and circumstances associated therewith. For instance, a system and method may interface with a variety of sources to retrieve relevant information, compile and assess the information, and/or enable access to the information by equipment owners, such as vehicle owners, or by vehicles, appliances, and/or other types of equipment. In one embodiment, information regarding a plurality of vehicles may be presented to the vehicle owner via a single display screen.

In one aspect, a computer-implemented method of compiling vehicle information may be provided. The computer-implemented method may include receiving vehicle information at a central server from at least one remote entity, and identifying, based upon the vehicle information, (i) a vehicle, (ii) an individual associated with the vehicle, and/or (iii) a circumstance associated with the vehicle. The computer-implemented method may further include determining, by a processor based upon the vehicle information, that the individual should be notified of the circumstance associated with the vehicle, generating a notification of the circumstance, and/or wirelessly communicating the notification to an electronic device associated with the individual. The method may include additional, fewer, or alternative actions, including those discussed elsewhere herein.

In another aspect, a system for compiling vehicle information may be provided. The system may include a communication module adapted to communicate data, a memory adapted to store non-transitory computer executable instructions, and a processor adapted to interface with the communication module. The processor may be configured to execute the non-transitory computer executable instructions to cause the processor to receive, via the communication module, vehicle information at a central server from at least one remote entity, and identify, based upon the vehicle information, (i) a vehicle, (ii) an individual associated with the vehicle, and/or (iii) a circumstance associated with the vehicle. The processor may be further configured to determine, based upon the vehicle information, that the individual should be notified of the circumstance associated with the vehicle, generate a notification of the circumstance, and/or wirelessly communicate, via the communication module, the notification to an electronic device associated with the individual. The system may include additional, fewer, or alternate components and/or functionality, including that discussed elsewhere herein.

In another aspect, a computer-implemented method of identifying vehicle circumstances or recall events may be provided. The method may include (a) receiving, via a processor, vehicle information from one or more sources, including one or more businesses, vehicle sensors, or third-party databases; (b) analyzing, via the processor, the information according to various models, algorithms, comparisons, and/or pre-determined rules to identify (1) a vehicle, and (2) a circumstance or recall event associated with the vehicle, the circumstance or recall event being (i) a circumstance or recall event based upon the make, model, and/or year of the vehicle; (ii) a specific recall event for the vehicle; and/or (iii) a maintenance-related circumstance for the vehicle; and/or (c) presenting information regarding the circumstance or recall event on a display screen for review by a vehicle owner to facilitate the handling of the circumstance or recall event in a timely manner. The information presented may be displayed on the display screen within a user interface that graphically or visually depicts a single source dashboard, the single source dashboard compiling and displaying information related to more than one vehicle owned by, or associated with, the vehicle owner. The method may further include an insurance provider adjusting auto insurance premiums, discounts, rewards, rebates, or points based upon the type of the dashboard functionality utilized by an insured (i.e., the vehicle owner or operator), and/or the amount that the dashboard functionality is used by the insured. The method may include additional, fewer, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
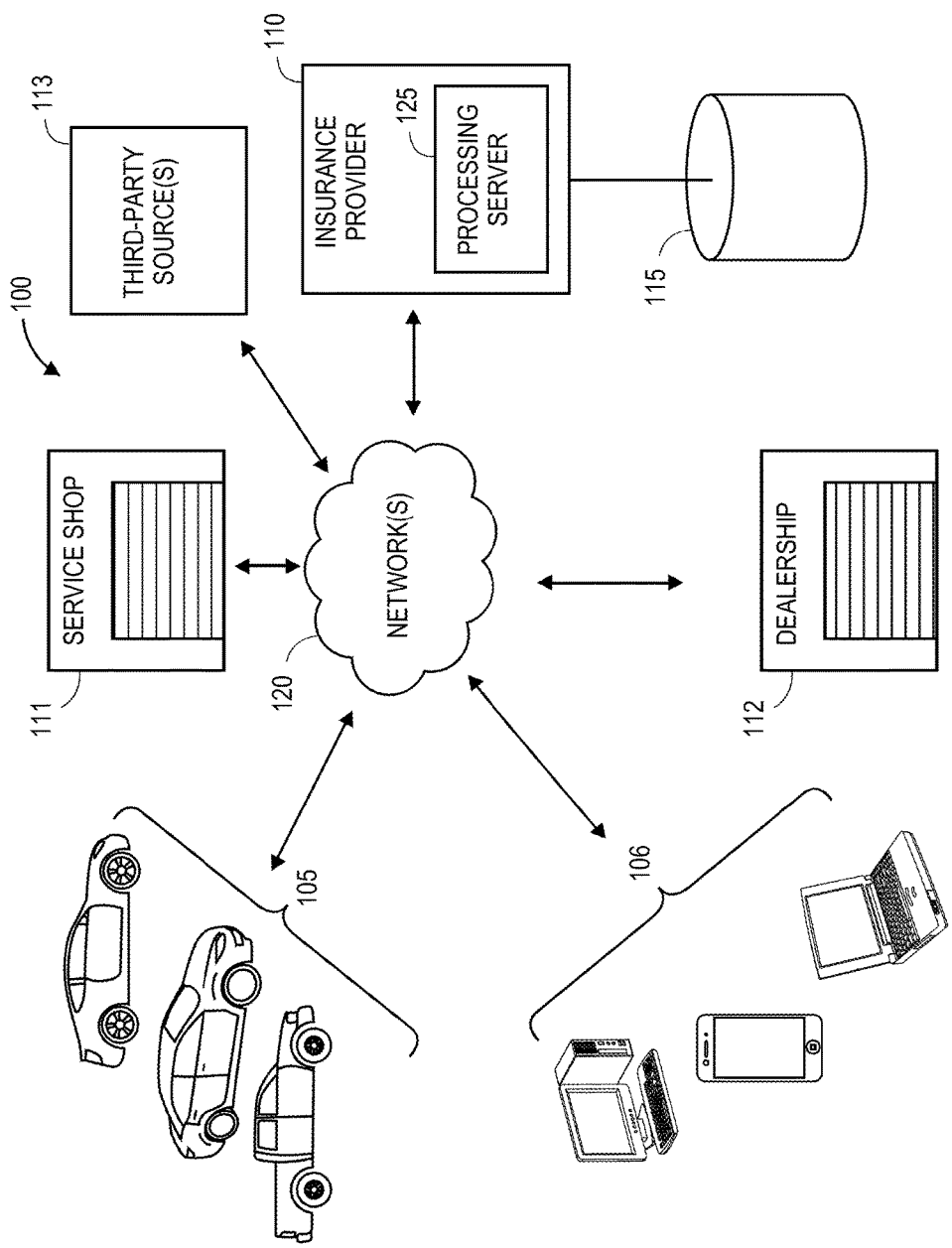
FIG. 1 depicts an exemplary environment including components and entities associated with retrieving and compiling vehicle information and assessing various vehicle circumstances, in accordance with some embodiments.

The present embodiments may relate to, inter alia, a single source solution that keeps track of (a) vehicles currently in a household or fleet, and (b) information that is available for each vehicle (including information available from vehicle manufacturers or distributors, automobile dealerships, and/or body shops), and that may offer customized notifications to suit vehicle owner needs and/or preferences. Additionally, an Original Equipment Manufacturer (OEM), other manufacturer, or government agency may not always know who currently owns all of the vehicles subject to recalls, bulletins, and other similar notifications. This may result in vehicle owners not receiving important vehicle and safety notifications in a timely manner, if at all.

Utilizing a database of vehicle owner information, an insurance provider, automobile manufacturer or dealership, or other entity may deliver up-to-date notifications about each vehicle in a household or fleet. Notification preferences may be customized to the needs or preferences of the vehicle owner or operator.

Also, an insurance provider may utilize an up-to-date inventory of vehicles in a household or fleet in other manners. With this information, the insurance provider may query various sources (vehicle manufacturer, seller, etc.), such as via wired or wireless communication networks, and continuously deliver to one location, such as a "single source dashboard" as described herein, all of the currently available information that a vehicle owner may want to know about each vehicle in the owner's household or fleet.

Further, connecting this platform to telematics and/or odometer capture solutions may enable the insurance provider to deliver additional services beyond the notifications mentioned above. For instance, the insurance provider may provide the vehicle owner or operator cost savings for using the dashboard functionality to maintain the vehicle or vehicles in repair. The insurance provider may adjust insurance premiums, discounts, rebates, or rewards based upon dashboard functionality, performing periodic maintenance on the vehicles, and/or ensuring all of vehicle recalls are handled in a timely manner.

In one aspect, the present embodiments may relate to notifying the insured of a recall event from a manufacturer, and for smart vehicles, notifying the insured of a software update or new software module or functionality that has recently become available for download. The present embodiments may also relate to notifying the insured that a vehicle is due for routine, scheduled, periodic, or other maintenance or repair.

In another aspect, the present embodiments may relate to identifying and compiling circumstances, such as circumstances related to maintenance, repair, or recall events, that may be associated with one or more vehicles or with an operator of the vehicle. The circumstances may be related to general vehicle information such as a recall notice, and/or may be related to specific vehicle information such as warranty information, maintenance schedules or recommendations, vehicle health metrics, and/or the like. An insurance provider or other entity may interface with a plurality of sources, such as the vehicles themselves (via transceivers, transmitters, or sensors of the vehicles), automobile manufacturers, brick-and-mortar businesses such as service shops or garages, third-party databases (including weather databases, and/or government or department of motor vehicle (DMV) databases, and/or other sources).

After receiving relevant information from the variety of sources, one or more algorithms executed by a processor may analyze the information to identify circumstances associated with the vehicle that a vehicle operator may want be notified of, or may otherwise want to review. The processor may further build one or more probabilistic or statistical models to determine whether there is a need to alert or notify a vehicle owner or operator of the vehicle circumstance. If the processor determines to alert or notify a vehicle owner or operator, the processor may cause an audible, vibrating, visual, or other type of alert or notification to be provided to an electronic device associated with the vehicle operator (such as a smart phone or a smart vehicle control system associated with the vehicle). Preferably, the alert provides minimal to no distraction, such as an audible alert, vibration, or non-push information.

The vehicle operator may interface with the electronic device, such as a smart phone, cell phone, tablet, phablet, laptop, notebook, PDA (personal digital assistant), pager, smart watch, hand-held computing device, wearable electronic device, computer, access point, node, relay, other device capable of wireless RF (radio frequency) communication, etc., or a vehicle system (such as a smart car or other vehicle-based computer or control system) to receive or retrieve the alert or notification. In one embodiment, the electronic device may interface with a dashboard-type interface to access and review the alert or notification, as well as any other relevant information associated with the vehicle and/or vehicles.

I. EXEMPLARY EMBODIMENTS

Generally, there are various types of information available about vehicles that individuals own including recalls, service bulletins, diagnostic reports, service timelines, warranties, software updates, and the like. Conventionally, the individuals receive or access this information in multiple ways, such as via mail, email, or accessing the information on the Internet. The process of accessing this information may be complicated by the number of vehicles an individual owns as well as the different makes and models of vehicles owned. Typically, more vehicles owned and types of vehicles may result in more variation in the information and/or how the information is accessed or delivered.

The embodiments discussed herein relates to a solution to collect and deliver vehicle information for all vehicles in a household in a way that is simple and personalized to each customer. In particular, an insurance provider or other entity may maintain records of which vehicles a customer has in his or her household. The insurance provider may create a dashboard-type interface (e.g., via a dedicated application) for each household that avails relevant information about each vehicle model in the household that is received from various sources. For instance, the insurance provider may interface with NHTSA.gov or other websites to receive important vehicle information and then provide the information to appropriate customers.

In operation, when an alert or similar message is issued, the insurance provider may relay that information to any customers (i.e., policyholders) through the interface, such as via a dedicated application or website account. In some cases, every vehicle having an insurance policy with the insurance provider may be automatically included. The insurance provider may also provide this information to any individual who registers an account with the service.

The interface may also provide customers with location-based service providers that may perform repairs or replacements based on any provided alerts, while avoiding any partnership-type relationships so that services need not be guaranteed. The interface may retrieve reviews of certain service providers (e.g., via Yelp®) to help customers make a decision on where to take their vehicles for service. In some cases, the interface may estimate a typical cost associated with a repair and avail the estimate to the customers. The insurance provider may implement the solution as opt-out, whereby customers may be automatically enrolled upon purchasing and insuring a vehicle. The customer may set up preferences for notifications or reminders (e.g., email, text messages, in-dash notifications, etc.) and the interface may deliver these notifications or reminders as they become available.

Insurance providers may interface this solution with other services and solutions, such as odometer reading services, telematics data capturing, reward programs, auto purchasing programs, and/or others. Additionally, insurance providers may leverage the solution to deliver other services, such as customized local offers; maintenance packages from local dealers or shops; vehicle registration renewals; auto purchasing through additional relationships (such as directly through auto manufacturers); facilitating in-network sales, purchasing, and/or finance of used cars; and others. Further, the insurance providers may engage with manufacturers in ensuring that software updates are provided to the customers, whereby in certain cases the insurance providers may charge the manufacturers to provide the service.

Customers are therefore afforded many benefits, including but not limited to: being aware when a recall has been issued for a vehicle and how to address the recall; being aware when terms of a warranty are about to expire and how to address them; being aware of service bulletins and how to address them, being notified of software updates; understanding the estimated cost associated with certain repairs or updates; the ability to find local service providers that are able to address issues; and/or obtaining vehicle health reports about the vehicles.

II. EXEMPLARY SINGLE SOURCE DASHBOARD FUNCTIONALITY

The novel systems and methods disclosed herein relate generally to notifying vehicle owners and operators of certain vehicle circumstances. According to certain aspects, the systems and methods implement a single-source, "dashboard-type" interface that enables the vehicle owners and/or operators to effectively and efficiently assess certain vehicle data and/or needs of the vehicle. The single source dashboard may be a single source of information regarding more than one vehicle, or even all of the vehicles, owned by a vehicle owner. A central entity, such as an insurance provider, may receive or retrieve various types of vehicle information from a plurality of source entities. In some embodiments, the source entities may be the vehicles themselves, electronic devices belonging to the vehicle owners or operators, automobile manufacturers, service shops, and/or other third-party sources, such as government agencies and the like.

The central entity may compile the information and associate the information with specific vehicles. In some embodiments, if the central entity is an insurance provider, one or more of the specific vehicles may be covered by a vehicle insurance policy or the insurance provider. The central entity may avail the compiled information in the dashboard-type interface accessible by electronic devices of the vehicle owners and operators. The central entity may further assess the need to notify the vehicle owners and operators of various vehicle circumstances. For example, the central entity may receive a notice that certain vehicles are subject to a recall. For further example, the central entity may maintain a maintenance schedule for a certain vehicle and, based upon certain telematics data from the vehicle, may determine that a suggested maintenance appointment is upcoming or expired. Of course, other vehicle circumstances are envisioned.

If the central entity determines to notify a vehicle owner or operator, the central entity may generate a notification and communicate the notification to the vehicle owner or operator. The vehicle owner or operator may view or access the notification on an electronic device, such as via a dedicated application. The notification may enable the vehicle owner or operator to take appropriate action, such as by scheduling any needed appointments, obtaining further information, or the like.

The systems and methods may therefore enable vehicle owners and operators to effectively and efficiently assess relevant vehicle information in a single source dashboard interface. Further, the vehicle owners and operators may be automatically notified of certain circumstances that, when remedied, may reduce unnecessary repair costs or other vehicle ownership costs. Of course, an insurance provider, by offering the systems and methods, may experience fewer insurance claims resulting from the generally better-maintained vehicles. The insurance provider may adjust insurance premiums, discounts, rewards, rebates, and/or loyalty points based upon the single source dashboard functionality utilized by the insured.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

III. EXEMPLARY ENVIRONMENT

FIG. 1 depicts an exemplary environment 100 including components and entities associated with retrieving and compiling vehicle information and assessing various vehicle circumstances. Although FIG. 1 depicts certain entities, components, and devices, it should be appreciated that additional or alternate entities and components are envisioned.

As illustrated in FIG. 1, the environment 100 may include one or more vehicles 105, where each vehicle 105 may be any type of car, automobile, truck, motorcycle, fleet of vehicles, marine vessel, and/or other vehicle capable of being driven or operated by a driver or operator. In some embodiments, the one or more vehicles 105 may be insured by a vehicle insurance policy offered by an insurance provider 110. Further, in some embodiments, at least two of the vehicles 105 may be associated with each other, such as by being covered by the same vehicle insurance policy.

The environment 100 may further include one or more electronic devices 106. In some cases, the electronic device(s) 106 may be installed as an on-board dash of the vehicle(s) 105, such as part of an original equipment manufacturer (OEM) installation on the vehicle(s) 105. In other cases, the electronic device(s) 106 may be installed by an aftermarket provider or belong to an owner, driver, or operator of the vehicle(s) 105. For example, one electronic device 106 may be a smartphone of a vehicle operator. It should be appreciated that other types of electronic devices are envisioned, such as notebook computers, tablets, GPS devices, wearable devices, and/or the like. The electronic device(s) 106 may be configured to communicate with any corresponding vehicle(s) 105. According to embodiments, the electronic device(s) 106 may be associated with the vehicle operator(s), whereby the vehicle operator(s) may have one or more insured vehicles. Further, in some embodiments, the electronic device 106 may be associated with multiple drivers of the same vehicle 105.

Each of the electronic devices 106 and the vehicles 105 may be configured to communicate with the insurance provider 110 via a network 120. The network 120 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others). The insurance provider 110 may be any individual, group of individuals, company, corporation, or other type of entity that may issue insurance policies for customers, such as a vehicle insurance policy associated with the one or more vehicles 105. According to the present embodiments, the insurance provider 110 may include one or more processing server(s) 125 configured to facilitate the functionalities as discussed herein. Although FIG. 1 depicts the processing server 125 as a part of the insurance provider 110, it should be appreciated that the processing server 125 may be separate from (and connected to or accessible by) the insurance provider 110. Further, although the present disclosure describes the systems and methods as being implemented by the insurance provider 110, it should be appreciated that other non-insurance related entities may implement the systems and methods. Accordingly, it is not necessary for the vehicles 105 to have associated vehicle insurance policies for the vehicle owners or operators to enjoy the benefits of the systems and methods.

As illustrated in FIG. 1, the environment 100 may further include a service shop 111, a dealership 112, and/or one or more third party sources 113. The service shop 111 may represent or correspond to a business for servicing the vehicles 105. For example, the service shop 111 may administer or perform oil changes, brake replacements, body work, and/or any other vehicle-related service. The dealership 112 may represent or correspond to a business that sells, and in some cases, services the vehicles 105. The dealership 112 may therefore be associated with an automobile manufacturer responsible for manufacturing the vehicles 105. The third party source(s) 113 may be any sources capable of retrieving or providing information related to the vehicle(s) 105. For example, one of the third party sources 113 may be a government source (e.g., http://www.safercar.gov/) that issues or maintains transportation-related notices. For further example, one of the third party sources 113 may be a private company (e.g., CARFAX®) that maintains vehicle history reports. It should be appreciated that additional third party sources are envisioned. Each of the service shop 111, the dealership 112, and/or the third party sources 113 may be configured to communicate with the insurance provider 110 via the network(s) 120.

The processing server 125 may be coupled to a database 115 configured to store vehicle-related information or data. In some cases, the database 115 may store data related to vehicle insurance policies and maintain insurance policies for multiple vehicles of the same household, and/or enable access to vehicle information related to the multiple vehicles. Further, the database 115 may store information associated with the service, maintenance, and/or general care of the vehicles 105. According to some embodiments, the processing server 125 may automatically receive, or manually retrieve, relevant vehicle-related information from any of the service shop 111, the dealership 112, the third party source(s) 113, the vehicles 105, and/or the electronic devices 106, and store the data in the database 115. The database 115 may then serve as a single source for information related to the service, maintenance, and/or general care of the vehicles 105. It should be appreciated that the database 115 may be a local database or server, a remote database or server, and/or may be a distributed database accessible by a network or "cloud" environment.

The processing server 125 may access the information stored in the database 115 (or retrieve information from any of the service shop 111, the dealership 112, the third party source(s) 113, the vehicles 105, and/or the electronic devices 106) and compile or assess the information. In compiling or assessing the information, the processing server 125 may identify various circumstances associated with the vehicles 105. In particular, the circumstances may be related to general vehicle information, such as a recall notice or software update (such as in the case of a smart vehicle), and/or may be related to specific vehicle information (such as warranty information, maintenance schedules or recommendations, and/or the like). Based upon the circumstances, the processing server 125 may determine whether to provide notifications (e.g., via the electronic devices 106) to the owners or operators of the vehicles 105. The notifications may indicate the general and/or specific information associated with the identified circumstances. In some embodiments, the processing server 125 may determine to provide the notifications based upon the urgency of the circumstances, which may be assessed according to various techniques, algorithms, and/or calculations.

The processing server 125 may generate a notification indicating information relevant to the circumstance, and may provide the notification to the appropriate vehicle 105 and/or to the appropriate electronic device 106. In some embodiments, a vehicle owner or operator may interface with an application executable by the electronic device 106 to view notifications, assess service dates, and/or access additional information. The application may support a dashboard-type interface that may include information available to the processing server 125 and associated with the vehicle 105. The dashboard-type interface may also include information associated with any other vehicles that may be covered under the same insurance policy and/or covered by the same insurance provider. The vehicle owner or operator may also directly request (e.g., via the application of the electronic device 106) relevant information from the processing server 125, and the processing server 125 may provide the relevant information to the vehicle owner or operator. Accordingly, the vehicle owner or operator may be able to effectively and efficiently assess any notifications, alerts, bulletins, maintenance information, warranty information, and/or other information relevant to the vehicle(s) 105 via a single-source dashboard that includes information from any or all of the service shop 111, the dealership 112, the third party source(s) 113, the vehicles 105, and/or the electronic devices 106.

IV. EXEMPLARY COMMUNICATION FLOW

Figure 2:
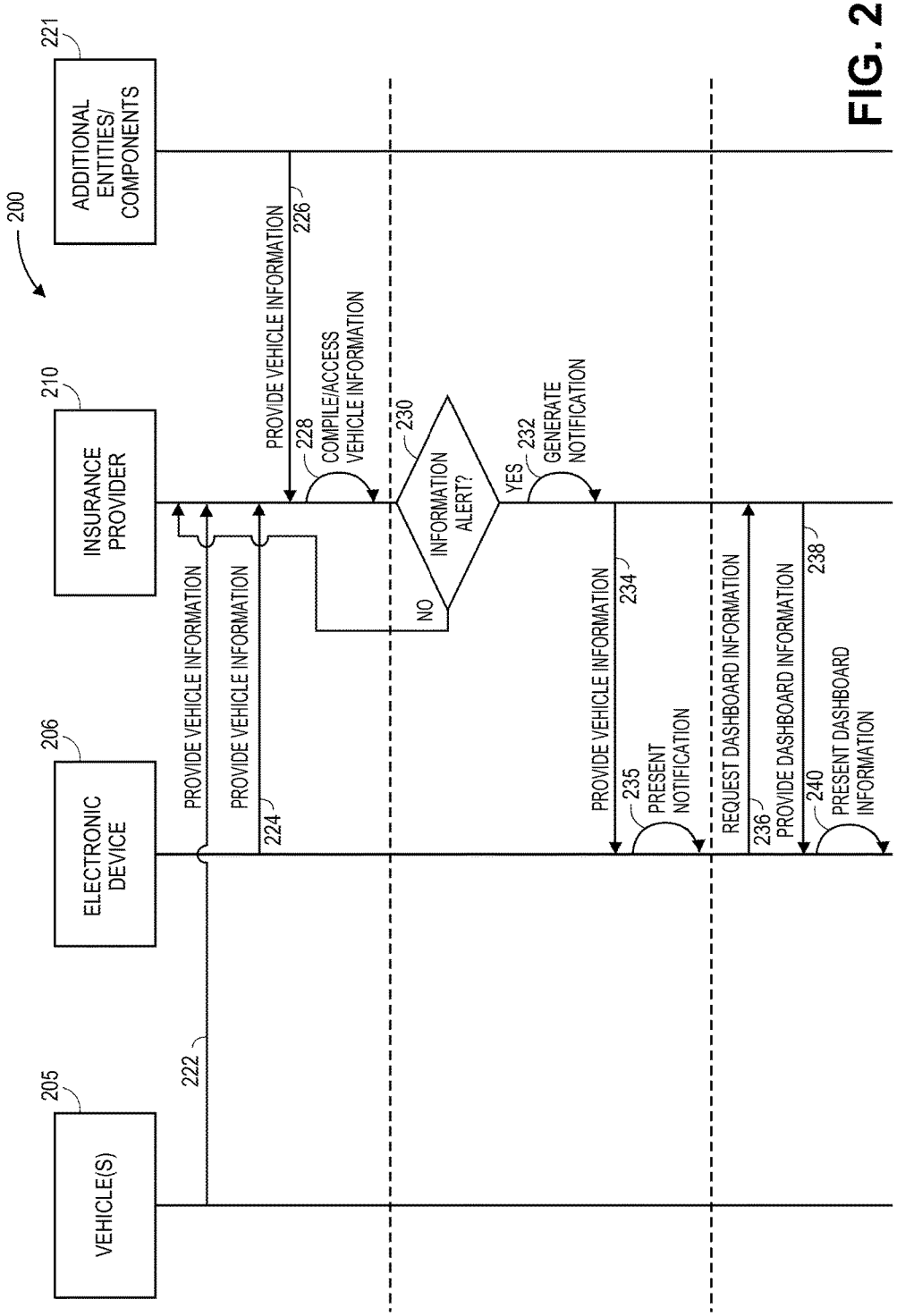
FIG. 2 depicts an exemplary signal diagram associated with retrieving and compiling vehicle information and assessing various vehicle circumstances, in accordance with some embodiments.

Referring to FIG. 2, illustrated is an exemplary signal diagram 200 associated with retrieving and compiling vehicle information and assessing various vehicle circumstances. In particular, FIG. 2 includes a vehicle 205 (such as the vehicle 105 as described with respect to FIG. 1), an electronic device 206 (such as the electronic device 106 as described with respect to FIG. 1), an insurance provider 210 (such as the insurance provider 110 as described with respect to FIG. 1), and one or more additional entities/components 221. It should be appreciated that the one or more additional entities/components 221 may be any or all of a service shop, a dealership, various third-party sources, vehicle or other equipment manufacturers or distributors, and/or other entities or components.

The signal diagram 200 may begin when a vehicle 205 provides (222) vehicle information to the insurance provider 210. The vehicle information from the vehicle 205 may include various sensor or telematics data of the vehicle (e.g., braking data, acceleration data, oil levels, location data, mpg data, odometer readings, diagnostic data, vehicle operation/handling data, speed data, etc.). Further, the vehicle information from the vehicle 205 may also include service or maintenance information, such as information that indicates past services performed on the vehicle 205 or recommended maintenance services. According to some embodiments, an on-board computer of the vehicle 205 may provide the information automatically or in response to a request from the insurance provider 210. In some cases, the on-board computer may provide the information when connected to a network, such as a home WiFi network when the vehicle 205 is parked in a garage or otherwise in range of the network.

The electronic device 206 may also provide (224) vehicle information to the insurance provider 210. The vehicle information from the electronic device 206 may include information that is manually entered by a vehicle owner or operator, and may also include an identification number (e.g., a VIN) of the vehicle 205. In some cases, the vehicle owner or operator may enter details related to services or maintenance performed on the vehicle 205, as well as warranty information associated with the vehicle. It should be appreciated that the electronic device 206 may automatically interface with the vehicle 205 to retrieve relevant information. Similar to the vehicle 205 providing the information in (222), the electronic device 206 may provide the information automatically or in response to a request from the insurance provider 210.

The additional entities/components 221 may also provide (226) vehicle information to the insurance provider 210. According to some embodiments, the vehicle information from the additional entities/components 221 may include recall notices or indications of software updates from automobile manufacturers, warranty information from dealerships, service or maintenance service reports from service shops, and/or other information. The vehicle information may include general vehicle identification information such as make, model, and year; and/or may include specific vehicle information, such as VINs, past maintenance or service information, and/or recommended maintenance or service schedules. Any or all of the additional entities/components 221 may provide the information automatically or in response to a request from the insurance provider 210. In some embodiments, the vehicle owner or operator may manually input information associated with a vehicle, for example if the vehicle is not insured by the insurance provider 210. It should be appreciated that the insurance provider 210 may receive the vehicle information from the various sources 205, 206, 221 at a single time, periodically, or over multiple occasions, such as when the various sources 205, 206, 221 have updated vehicle information.

After receiving the vehicle information, the insurance provider 210 may compile/assess (228) the vehicle information. In particular, the insurance provider 210 may determine which vehicles the received vehicle information corresponds to, such as any vehicles that have an insurance policy with the insurance provider 210. For example, if the insurance provider 210 receives a recall notice that identifies a certain make, model, and year of a vehicle subject to recall, the insurance provider 210 may identify any vehicles that match the make, model, and year. For further example, if the insurance provider receives an indication of a software update to an on-board operating system of a vehicle, the insurance provider 210 may identify any vehicles that support or implement the on-board operating system. Additionally, the insurance provider 210 may aggregate information associated with vehicles that are covered by the same insurance policy and/or same insurance provider, such as vehicles of the same household. The insurance provider 210 may update a database with records of the compiled information, where the records associate the proper vehicle information with the proper vehicle identification. Further, in some embodiments, the insurance provider 210 may notify various entities (e.g., automobile manufacturers or other OEMs) of the identities of individuals who own certain vehicles.

Further, in assessing the vehicle information, the insurance provider 210 may identify any circumstances of the vehicle 205. For example, the insurance provider 210 may identify vehicle recalls, approaching warranty terms, service or maintenance schedules that indicate recommended times or mileages for replacement parts or services (e.g., oil or other fluid changes, brake (brake pad or other components) replacement, engine or other belt replacement, tire rotation or replacement, wind shield wiper replacement, etc.), past vehicle services, and/or the like. The insurance provider 210 may utilize data from multiple sources in identifying the circumstances. For example, the insurance provider 210 may receive maintenance information of the vehicle 205 from a service shop that serviced the vehicle. The insurance provider 210 may determine a subsequent maintenance condition for the vehicle, for example a recommended oil change. The insurance provider 210 may subsequently receive telematics data from the vehicle 205 indicating a current mileage, and the insurance provider 210 may determine, based upon the current mileage, that the subsequent maintenance condition has not been met (e.g., the recommended oil change mileage is approaching, has not been performed, or has expired). The database associated with the insurance provider 210 may maintain data related to the identified circumstances, thus enabling a single organized view of vehicle information received from the various sources 205, 206, 211.

The insurance provider 210 may also determine 230, based upon the vehicle circumstance, whether there is a need to alert or notify a vehicle owner or operator of the vehicle circumstance. The insurance provider 210 may employ various techniques, algorithms, probabilistic or statistical models, and/or calculations to perform the determination. In some cases, the insurance provider 210 may determine that the vehicle 205 is past due for a scheduled maintenance or replacement, or has an upcoming scheduled maintenance or replacement. For example, if the insurance provider 210 in (226) receives an indication that the vehicle 205 had an oil change in January with a recommended subsequent oil change for April, and if by May the insurance provider 210 has not received an indication that the vehicle 205 had the subsequent oil change, the insurance provider 210 may determine that the vehicle owner or operator may need to be reminded of the oil change. In other cases, the insurance provider 210 may determine that certain recall, warranty, or service information may need to be provided to the vehicle owner or operator. For example, if the insurance provider 210 receives a recall notice from an automobile manufacturer and determines that the recall notice applies to the vehicle 205, the insurance provider 210 may determine that the vehicle owner or operator may need to be notified of the recall. In one embodiment, the insurance provider 210 may determine that the vehicle owner or operator has not received notice of the recall as of yet before sending the notification, and/or the insurance provider 210 may determine that the vehicle owner or operator has not taken care of or otherwise handled the recall notice as of yet (i.e., still has not taken the vehicle to the shop for repair) and send a reminder notification to the vehicle owner or operator that the vehicle has an outstanding recall notice.

If the insurance provider 210 determines that there is not a need to alert or notify the vehicle owner or operator ("NO"), processing may return to 222 or to other functionality where the insurance provider 210 may await updated vehicle information from the various sources 205, 206, 211. If the insurance provider 210 determines that there is a need to alert or notify the vehicle owner or operator ("YES"), the insurance provider 210 may generate (232) a notification that includes relevant information related to the circumstance. For example, the notification may identify an upcoming or past due service, a recall notice or service bulletin, upcoming warranty expiration terms, and/or other information. The insurance provider 210 may provide (234) the notification to the electronic device 206 via a network connection. After receiving the notification, the electronic device 206 may present (235) the notification, such as via a dedicated application executing thereon. It should be appreciated that the electronic device 206 may present the notification according to various channels or techniques, such as through audio, a visual notification, haptic feedback, and/or others. In some embodiments, the notification may be delivered through other electronic communication channels such as email.

In some embodiments, the vehicle owner or operator may wish to actively view up-to-date vehicle information associated with the vehicle 205. As discussed herein, the insurance provider 210 may maintain a dashboard of information retrieved or received from a plurality of sources and associated with the vehicle 205. The electronic device 206 may request (236) (e.g., via a dedicated application) the insurance provider 210 for dashboard information and the insurance provider 210 may provide (238) or otherwise avail the dashboard information for access or viewing by the vehicle owner or operator. Of course, the dashboard information may indicate any of the data received in 222, 224, and 226, as well as any circumstances identified by the insurance provider 210. Accordingly, the electronic device 206 may present (240) the dashboard information, or otherwise enable the vehicle owner or operator to interface with the dashboard, perform queries, and/or facilitate other operations associated with the dashboard. In some embodiments, the insurance provider 210 may maintain, in the dashboard, life-to-date information for the vehicle 205.

V. EXEMPLARY USER INTERFACES

Figure 3:
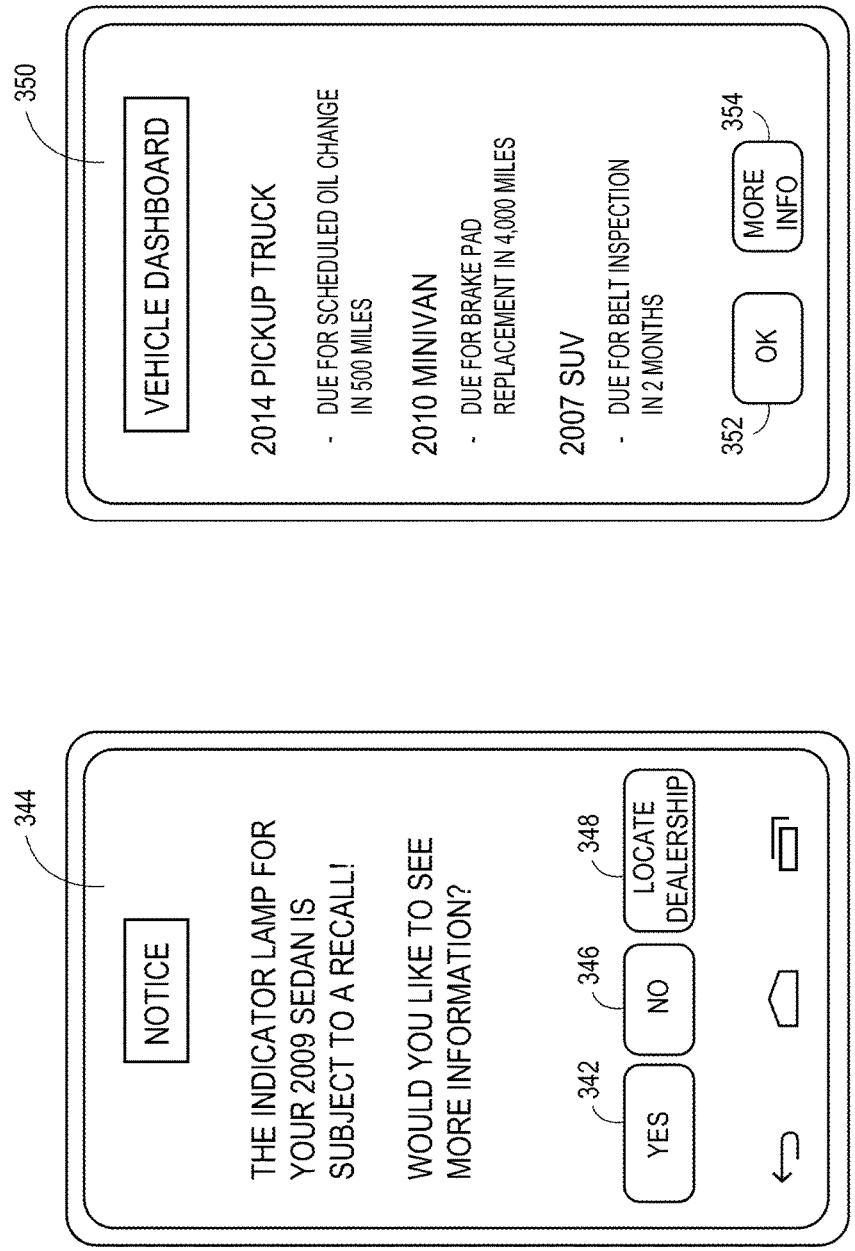
FIGS. 3A and 3B depict exemplary interfaces associated with presenting example vehicle notifications in accordance with some embodiments.

FIGS. 3A and 3B illustrate exemplary interfaces associated with example notifications or alerts. An electronic device (e.g., an on-board dash system, a smartphone, etc.) may be configured to display the interfaces and receive selections and inputs via the interfaces. For example, a dedicated application that is configured to operate on the vehicle or consumer device may display the interfaces. It should be appreciated that the interfaces are merely examples and that alternative or additional content is envisioned.

FIG. 3A illustrates an interface 344 including a notice of a circumstance related to a vehicle (as shown: a 2009 sedan), where the notice may be received from an insurance provider. In particular, the notice indicates that the indicator lamp for the 2009 sedan is subject to a recall. The interface 344 enables a user to select to retrieve more information via a "YES" selection 342 and a "NO" selection 346. Further, the interface 344 includes a "locate dealership" selection 348 that enables the user to select to locate a dealership that may offer the indicator lamp replacement or otherwise provide more information of the recall.

FIG. 3B illustrates an interface 350 related to a vehicle dashboard for a vehicle. According to some embodiments, the electronic device may access the vehicle dashboard to review up-to-date information associated with one or more vehicles that may be covered by the same insurance policy. As illustrated in FIG. 3B, the interface 350 may include information about three (3) vehicles that are covered by the same insurance policy or insurance provider: a 2014 pickup truck, a 2010 minivan, and a 2007 SUV. The interface 350 may further include additional information related to upcoming scheduled maintenance or service for the vehicles. For example, the 2014 pickup truck is due for a scheduled oil change in 500 miles. The interface 350 may further include an "OK" selection 352 that enables the user to dismiss the interface 350 or return to a previous or alternative interface. The interface 350 also may include a "more info" selection 354 that enables the user to select to retrieve more information available from the vehicle dashboard. The user interfaces may be configured to have additional, less, or alternate functionality, including functionality discussed elsewhere herein.

VI. EXEMPLARY COMPILATION AND NOTIFICATION

Figure 4:
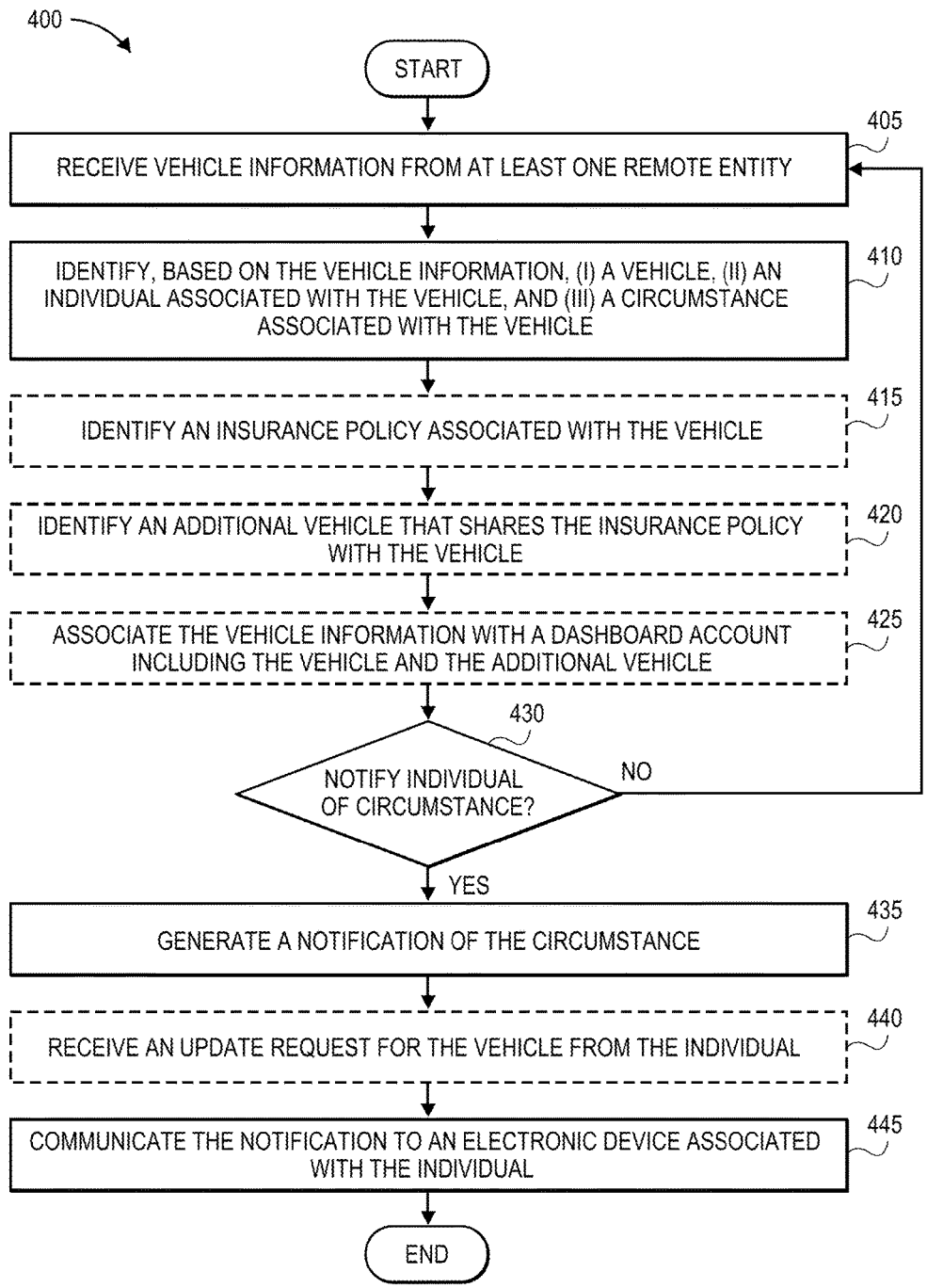
FIG. 4 depicts an exemplary flow diagram associated with retrieving and compiling vehicle information and assessing various vehicle circumstances, in accordance with some embodiments.

Referring to FIG. 4, depicted is a block diagram of an exemplary method 400 of compiling vehicle information and notifying individuals of vehicle circumstances. The method 400 may be facilitated between the insurance provider 110 (and specifically the processing server 125) as depicted in FIG. 1 and an individual associated with a vehicle. The individual may access an electronic device (such as the electronic device 106) to request information and view notifications.

The method 400 may begin when the insurance provider receives (block 405) vehicle information from at least one remote entity. As discussed herein, the vehicle information may include information specific to the vehicle such as telematics data, warranty information, and maintenance information, as well as general information including recall notices, service bulletins, and the like. Further, the at least one remote entity may include the vehicle itself, and/or various electronic devices, such as a smartphone of the individual, dealerships, service shops, or general third-party sources.

The insurance provider may identify (block 410), based upon the vehicle information, (i) a vehicle, (ii) an individual associated with the vehicle, and/or (iii) a circumstance associated with the vehicle. In some cases, the insurance provider may identify the vehicle from a VIN or other identification included in the vehicle information. In other cases, such as if the vehicle information is a recall notice or other information that identifies a vehicle type, the insurance provider may identify the vehicle by comparing the vehicle type to a listing of specific vehicles. In embodiments, the listing of vehicles may include vehicles that are covered by an insurance policy or policies offered by the insurance provider, where the individual may be a policyholder for the insurance policy. As discussed herein, the circumstance may be a recall, a maintenance condition, or the like.

The insurance provider may optionally identify (block 415) an insurance policy associated with the vehicle, where the individual may be the policyholder for the insurance policy. Further, the insurance provider may optionally identify (block 420) an additional vehicle that shares the same (a) insurance policy with the vehicle, (b) vehicle owner or operator, (c) insurance provider, and/or (d) other characteristic. In some embodiments, the original vehicle information received in block 405 may also include information about the additional vehicle. The insurance provider may then optionally associate (block 425) the vehicle information with a dashboard account including the vehicle and the additional vehicle. The dashboard account may therefore offer a "single source" view of relevant information related to the vehicle and the additional vehicle.

The insurance provider may determine (block 430) whether to notify the individual of the circumstance. In one embodiment, such as if the vehicle information received in block 405 includes maintenance information for the vehicle, the insurance provider may determine a subsequent maintenance condition (e.g., a recommended future appointment) for the vehicle. The insurance provider may determine to notify the individual if the subsequent maintenance condition has not been met, such as if the subsequent maintenance condition is approaching or has expired. For example, if the subsequent maintenance condition is an oil change appointment that is recommended for October 1, the insurance provider may determine to notify the individual on October 1 if there is no indication that the oil change appointment has taken place. In other embodiments, such as if the circumstance is that the vehicle is subject to a recall, the insurance provider may determine to automatically notify the individual.

If the insurance provider determines to not notify the individual of the circumstance ("NO"), processing may return to block 405 (or to other functionality) where additional vehicle information may be received. If the insurance provider determines to notify the individual of the circumstance ("YES"), the insurance provider may generate (block 435) a notification of the circumstance. In some embodiments, the notification may include any combination of textual or graphical content that identifies the circumstance.

The insurance provider may optionally receive (block 440) an update request for the vehicle(s) from the individual. The update request may correspond to the individual requesting access to an account dashboard (or similar interface) via an electronic device. Either in response to generating the notification or receiving the update request, the insurance provider may communicate (block 445) the notification to the electronic device associated with the individual. The electronic device may then present the notification to the individual according to various techniques. The method may include additional, fewer, or alternate actions, including those discussed elsewhere herein.

VII. EXEMPLARY SERVER

Figure 5:
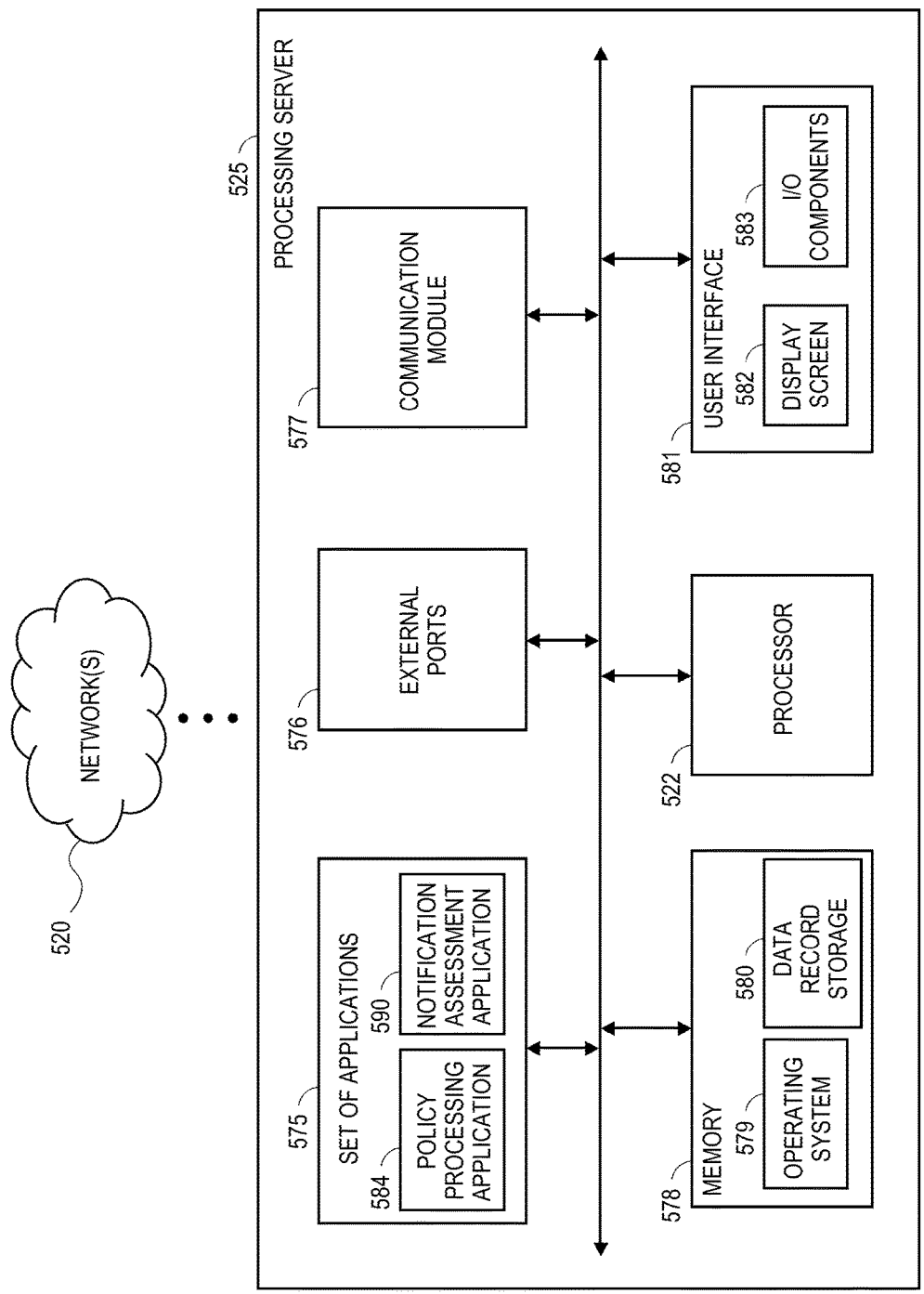
FIG. 5 is a block diagram of an exemplary processing server in accordance with some embodiments.

FIG. 5 illustrates a diagram of an exemplary processing server 525 (such as the processing server 125 discussed with respect to FIG. 1) in which the functionalities as discussed herein may be implemented. It should be appreciated that the processing server 525 may be associated with an insurance provider, as discussed herein.

The processing server 525 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be a policy processing application 584 configured to manage customer insurance policies, and another of the set of applications 575 may be a notification assessment application 590 configured to compile received vehicle information, assess the need to notify individuals, and/or generate notifications. It should be appreciated that other applications are envisioned.

The processor 522 may interface with the memory 578 to execute the operating system 579 and the set of applications 575. According to some embodiments, the memory 578 may also include a data record storage 580 that stores various vehicle information of a plurality of vehicles that is received from various entities. The policy processing application 584 and the notification assessment application 590 may interface with the data record storage 580 to retrieve relevant information that the policy processing application 584 and the notification assessment application 590 may use to manage insurance policies, generate notifications, and/or perform other functionalities. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 525 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may receive, via the network 520, various types of vehicle information from various entities; and send, via the network 520, various notifications to individuals. The processing server 525 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the processing server 525 via the user interface 581 to process insurance policies and/or perform other functions. The processing server 525 may be configured to perform insurance-related functions, such as calculating or adjusting insurance premiums, discounts, rebates, rewards, or loyalty points based upon single source dashboard functionality usage, or type of which that is employed by, the insured. In some embodiments, the processing server 525 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VIII. EXEMPLARY DASHBOARD USER INTERFACE

Figure 6:
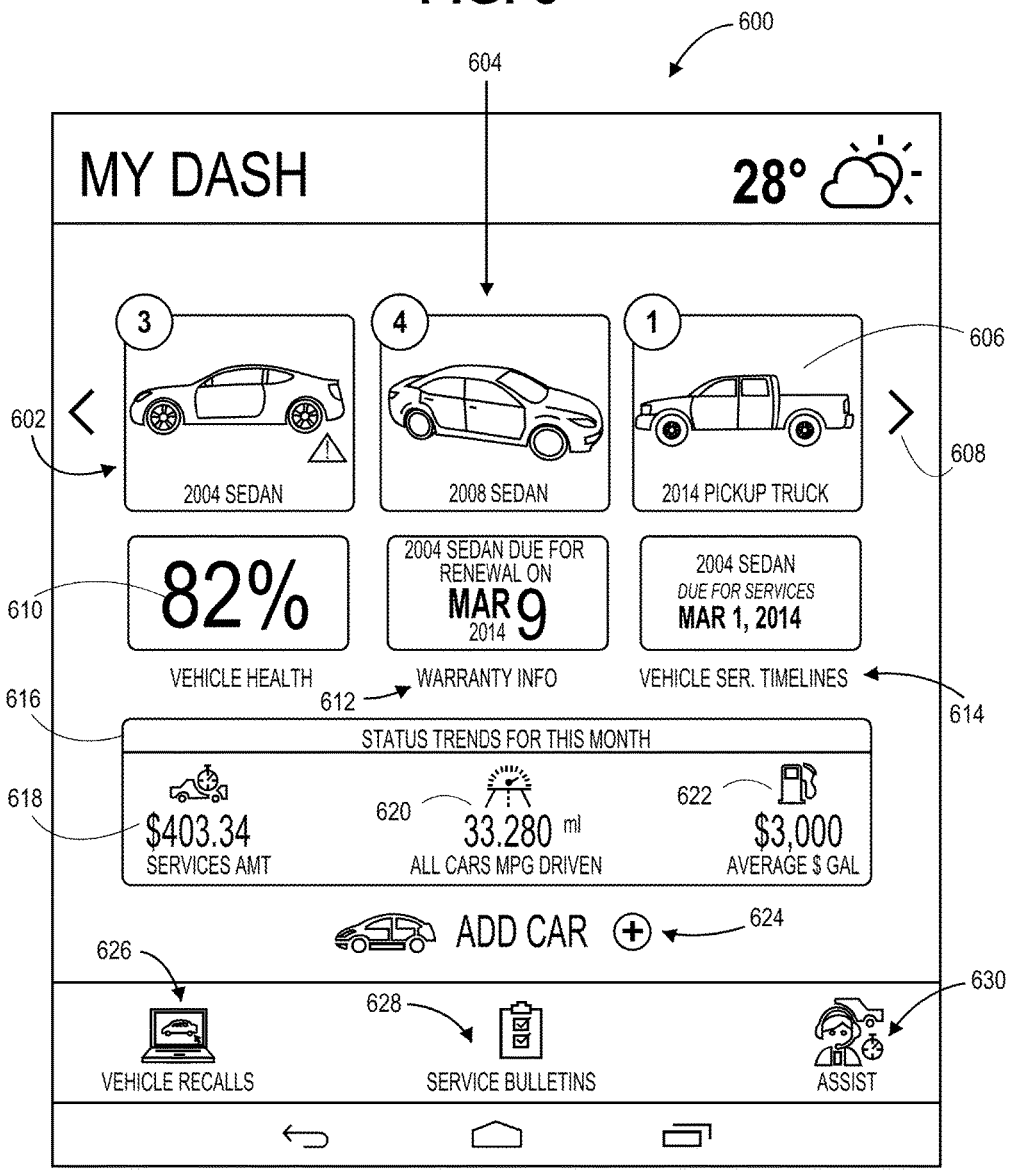
FIG. 6 is an exemplary dashboard user interface for presenting various types of vehicle information.

FIG. 6 depicts an exemplary dashboard user interface 600 for presenting various vehicle information in a dashboard. It should be appreciated that the dashboard user interface 600 may be displayed or presented by various devices such as, for example, a smart phone, cell phone, tablet, phablet, laptop, notebook, PDA, pager, smart watch, hand-held computing device, wearable electronic device, computer, access point, node, relay, other device capable of wireless RF communication, etc., or an original equipment or aftermarket vehicle system (such as a smart car or other vehicle-based computer or control system). It should be appreciated that the contents of the dashboard user interface 600 are merely exemplary and that additional or alternative content is envisioned.

The dashboard user interface 600 may include images 602, 604, 606 of various vehicles that are included in the same insurance policy or provider, or that are otherwise associated with each other. For instance, the vehicles may all be owned by the same vehicle owner or by the same family.

As illustrated in FIG. 6, the dashboard user interface 600 may include a more selection 608 that enables a user to scroll to view additional vehicles. The dashboard user interface 600 may enable a user to select one of the displayed vehicles to view more information about the selected vehicle. For example, if the user selects the image 602 of the 2004 sedan, the dashboard user interface 600 may display a vehicle health metric 610 that indicates a numeric value representing the vehicle's overall health or condition, warranty information 612 that indicates relevant terms of a warranty, and/or a vehicle service timeline 614 that indicates service dates that may be due or recommended for the vehicle.

The dashboard user interface 600 may further include a status trends section 616 that indicates certain metrics for one or more of the vehicles (e.g., only the selected vehicle or all of the vehicles in an insurance policy). In particular, the status trends section 616 may include a services amount 618 that indicates an amount of money that has been spent on various vehicle services, a fuel efficiency metric 620 that indicates a miles per gallon metric for the vehicles, and/or a fuel cost metric 622 that indicates an amount spent on fuel for the vehicles. Additionally, the dashboard user interface 600 may include an add vehicle option 624 that enables a user to add a vehicle to the dashboard user interface 600, such as a vehicle covered by the same insurance provider or policy, or another vehicle owned or operated by the user. The dashboard user interface 600 may also include a remove vehicle option (not shown).

The dashboard user interface 600 may further include a section that enables a user to request additional information related to the vehicles. In particular, the user interface 600 may include a vehicle recall selection 626 that, when selected, causes the electronic device to retrieve recall information for the various vehicles in the dashboard; a service bulletin selection 628 that, when selected, causes the electronic device to retrieve service bulletin information associated with the various vehicles in the dashboard; and/or an assist selection 630 that, when selected, causes the electronic device to connect with a service representative to answer any questions that a user or customer may have. The dashboard user interface may include additional, less, or alternate functionality, including that discussed elsewhere herein.

For example, a dashboard user interface for visually presenting information regarding a number of vehicles may be provided. The dashboard user interface may graphically represent or visually depict a plurality of vehicles owned or operated by a user (or user's family) simultaneously. Each vehicle graphical representation may be configured to allow the user to access and display on the dashboard user interface more information about the selected vehicle. The additional information may include: (a) a vehicle health metric or representation of the vehicle's overall health or condition; (b) warranty information associated with the vehicle warranty; and/or (c) service information indicating that vehicle maintenance is due or recommended. The dashboard user interface may also graphically represent or visually depict vehicle trend information, which may be related to (d) a services amount indicating the amount of money that has been spent on various vehicle services; (e) a fuel efficiency representation for various vehicles or vehicle types; and/or (f) a fuel cost representation indicating an average amount spent on fuel for various vehicles or vehicle types. The dashboard user interface may include functionality for adding additional vehicles or deleting existing vehicles, and/or retrieving and displaying vehicle recall or service bulletin information. The dashboard user interface may include additional, less, or alternate functionality.

IX. EXEMPLARY COMPUTER-IMPLEMENTED METHODS

In one aspect, a computer-implemented method of identifying vehicle circumstances or recall events may be provided. The method may include (a) receiving, via a processor, vehicle information from one or more sources, including one or more businesses, vehicle sensors, or third-party databases; (b) analyzing, via the processor, the information according to various models, algorithms, comparisons, and/or pre-determined rules to identify (1) a vehicle, and (2) a circumstance or recall event associated with the vehicle, the circumstance or recall event being (i) a circumstance or recall event based upon the make, model, year of, and/or software installed on the vehicle; (ii) a specific recall event for the vehicle; and/or (iii) a maintenance-related circumstance for the vehicle; and/or (c) presenting information regarding the circumstance or recall event on a display screen for review by a vehicle owner to facilitate the handling of the circumstance or recall event in a timely manner. The information presented may be displayed on the display screen within a user interface that graphically or visually depicts a single source dashboard, the single source dashboard compiling and displaying information related to more than one vehicle owned by the vehicle owner. The method may further include an insurance provider adjusting auto insurance premiums, discounts, rewards, rebates, or points based upon the type of the dashboard functionality utilized by an insured, and/or the amount that the dashboard functionality is used by the insured (i.e., the vehicle owner). The method may include additional, fewer, or alternate actions, including those discussed elsewhere herein.

In another aspect, a computer-implemented method of identifying vehicle circumstances may be provided. The method may include (a) receiving vehicle information from one or more sources such as various businesses, vehicle sensors, or third-party databases; (b) analyzing the information according to various models or algorithms to identify a vehicle and a circumstance associated with the vehicle, the circumstance being a general circumstance based upon the make, model, and/or year of the vehicle, or a specific circumstance for the vehicle; and/or (c) availing the circumstance (or otherwise present information regarding the circumstance or event) for review by an individual, such as a vehicle operator or owner. The method may include additional, fewer, or alternate actions, including those discussed elsewhere herein.

In another aspect, a computer-implemented method of notifying vehicle operators of circumstances of a vehicle may be provided. The method may include (a) receiving vehicle information from one or more sources; (b) identifying a circumstance associated with the vehicle, (c) determining, according to one or more algorithms, that an individual such as a vehicle operator should be notified of the circumstance; and/or (d) communicating a notification to a device of the individual, where the device may display or indicate the notification or enable the individual to access or review the notification. The method may include additional, fewer, or alternate actions, including those discussed elsewhere herein.

In a further aspect, a computer-implemented method of supporting a dashboard of vehicle information may be provided. The method may include (a) collecting various vehicle information from one or more sources; (b) examining the various vehicle information to identify relevant vehicle metrics or circumstances; (c) compiling and organizing the various vehicle information within an interface, such as a dashboard-type interface; and/or (d) enabling a user such as a vehicle operator to access the interface to review the information. The method may include additional, fewer, or alternate actions, including those discussed elsewhere herein.

X. EXEMPLARY ELECTRONIC DEVICES

In one aspect, an electronic device configured to facilitate the identification of vehicle circumstances may be provided. The electronic device may include a memory configured to store various vehicle-related information; one or more sensors; and/or a processor configured to: (a) interface with various sources such as various businesses, the sensors, or third-party databases to retrieve vehicle-related information; (b) analyze the information according to various models or algorithms to identify one or more circumstances associated with the vehicle, the circumstances being general circumstances based upon the make, model, and/or year of the vehicle, or specific circumstances for the vehicle; and/or (c) avail the circumstances (or otherwise present information regarding the circumstance or event) for review by an individual, such as a vehicle operator. The electronic device may be configured to have additional, less, or alternate functionality, including the functionality discussed elsewhere herein.

In another aspect, an electronic device configured to notify vehicle operators of circumstances of a vehicle may be provided. The electronic device may include a memory such as a database configured to store various vehicle-related information and circumstances associated therewith; and/or a processor configured to (a) retrieve vehicle information from one or more sources; (b) identify a circumstance associated with the vehicle and based upon the retrieved information, (c) determine, according to one or more algorithms, that an individual such as a vehicle operator should be notified of the circumstance; and/or (d) notify the individual of the circumstance, such as by displaying or indicating the notification or enabling the individual to access or review the notification. The electronic device may be configured to have additional, less, or alternate functionality, including the functionality discussed elsewhere herein.

In a further aspect, an electronic device configured to support a dashboard of vehicle information may be provided. The electronic device may include a memory to store various vehicle-related information and circumstances associated therewith; a user interface configured to display information; and/or a processor configured to: (a) collect various vehicle information from one or more sources such as integrated; (b) examine the various vehicle information to identify relevant vehicle metrics or circumstances; and/or (c) compile, organize, and display the various vehicle in the user interface. The electronic device may be configured to have additional, less, or alternate functionality, including the functionality discussed elsewhere herein.

XI. EXEMPLARY CIRCUMSTANCE IDENTIFICATION AND NOTIFICATION FUNCTIONALITY

In one aspect, an electronic device configured to facilitate the identification of vehicle circumstances may be provided. The electronic device may include a means for storing various vehicle-related information and means for sensing various vehicle metrics; and/or (a) means for interfacing with various sources such as various businesses, the sensors, or third-party databases to retrieve vehicle-related information; (b) means for analyzing the information according to various models or algorithms to identify one or more circumstances associated with the vehicle, the circumstances being general circumstances based upon the make, model, and/or year of the vehicle, or specific circumstances for the vehicle; and/or (c) means for availing the circumstances for review by an individual such as a vehicle operator. The mobile device may include one or more processors, memory units, a combination of processor(s) and memory unit(s), applications, non-transitory computer instructions, and/or other components that provide for or implement the "means for" functionality noted above. The mobile device may include additional, less, or alternate functionality, including that discussed elsewhere herein.

In another aspect, an electronic device configured to notify vehicle operators of circumstances of a vehicle may be provided. The electronic device may include a means for storing various vehicle-related information and circumstances associated therewith; and/or (a) means for retrieving vehicle information from one or more sources; (b) means for identifying a circumstance associated with the vehicle and based upon the retrieved information, (c) means for determining, according to one or more algorithms, that an individual such as a vehicle operator should be notified of the circumstance; and/or (d) means for notifying the individual of the circumstance. The mobile device may include one or more processors, memory units, a combination of processor(s) and memory unit(s), applications, non-transitory computer instructions, and/or other components that provide for or implement the "means for" functionality noted above. The mobile device may include additional, less, or alternate functionality, including that discussed elsewhere herein.

XII. EXEMPLARY REMOTE SERVERS

In one aspect, a remote server configured to identify vehicle circumstances may be provided. The server may include (i) a communication module adapted to send and receive data; (ii) a memory adapted to store vehicle-related information; and/or (iii) a processor adapted to (a) receive vehicle information from one or more sources (such as various businesses, vehicle sensors, or third-party databases), (b) analyze the information according to various models or algorithms to identify a vehicle and a circumstance associated with the vehicle, the circumstance being a general circumstance based upon the make, model, and/or year of the vehicle, or a specific circumstance for the vehicle, and/or (c) avail the circumstance (or otherwise present information regarding the circumstance or event) for review by an individual, such as a vehicle operator. The server may include additional, less, or alternate functionality, including that discussed elsewhere herein.

In another aspect, a remote server configured to notify vehicle operators of circumstances of a vehicle may be provided. The server may include (i) a communication module adapted to send and receive data; (ii) a memory adapted to store vehicle-related information; and/or (iii) a processor adapted to receive vehicle information from one or more sources via the communication module, identify a circumstance associated with the vehicle, determine, according to one or more algorithms, that an individual such as a vehicle operator should be notified of the circumstance, and/or (d) communicate, via the communication module, a notification to a device of the individual, where the device may display or indicate the notification or enable the individual to access or review the notification. The server may include additional, less, or alternate functionality, including that discussed elsewhere herein.

XIII. OTHER EMBODIMENTS

In addition to vehicles, the present embodiments may also be related to other equipment. The same functionality related to vehicles noted herein may also be applicable to home appliances and/or other equipment. For instance, there may be recall notices related to defective parts or safety issues that manufacturers want customers to be aware of and/or timely correct or otherwise take care of.

As examples, recall events or repair circumstances may be associated with certain makes or models of household appliances, such as refrigerators, water heaters, dish or clothes washers, clothes dryers, ovens, stoves, etc. Other equipment may also have recall events, such as consumer products like baby seats.

An insurance provider may gather information about the items in the home, such as by make and model. When a relevant recall event is announced, the insurance provider may search a database for the defective equipment and promptly notify the owners of the equipment of the recall event.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., electronic device, vehicle controller, within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., electronic device, vehicle controller, within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "insurance policy," as used herein, generally refers to a contract between an insurer and an insured, such as for automobile or other vehicle insurance. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a vehicle owner or operator, or a business or other organizational entity) that provides insurance products, e.g., by offering and issuing insurance policies, including auto or home insurance. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of compiling vehicle information, the method comprising:
   receiving maintenance information associated with a vehicle at a central server from a service shop that serviced the vehicle, wherein the maintenance information at least indicates that a software update to an on-board operating system installed on the vehicle is available, and wherein the software update is from a manufacturer of the vehicle;
   identifying, based upon the maintenance information, (i) the vehicle, and (ii) an individual associated with the vehicle, wherein the individual has a dashboard account with the vehicle associated therewith;
   determining, by a processor of the central server, a subsequent maintenance condition for the vehicle based at least in part upon the maintenance information;
   subsequently receiving, from the vehicle remote from the central server, telematics data indicating operation information of the vehicle;
   determining, by the processor of the central server based upon the telematics data, that the subsequent maintenance condition has not been met;
   generating a notification associated with the subsequent maintenance condition, the notification indicating a set of location-based service providers and at least one review for each of the set of location-based service providers;
   wirelessly communicating the notification to an electronic device associated with the individual;
   identifying (i) an insurance policy associated with the vehicle, and (ii) an additional vehicle that shares the insurance policy with the vehicle;
   associating the subsequent maintenance condition with the dashboard account including the vehicle and the additional vehicle that share the insurance policy; and
   enabling the individual to access, via a user interface associated with the electronic device, the dashboard account to review information associated with the vehicle and the additional vehicle, wherein the user interface associated with the electronic device concurrently indicates (i) at least one vehicle health metric, (ii) warranty information, (iii) at least one vehicle service timeline, and (iv) at least one status trend for at least one of the vehicle and the additional vehicle.

2. The computer-implemented method of claim 1, wherein identifying the vehicle and the individual associated with the vehicle comprises:
   comparing the maintenance information to a listing of specific vehicles to identify the vehicle and the individual associated with the vehicle.

3. The computer-implemented method of claim 1, wherein wirelessly communicating the notification to the electronic device comprises:
   receiving, from the electronic device, an update request for the vehicle; and
   responsive to receiving the update request, wirelessly communicating the notification to the electronic device.

4. The computer-implemented method of claim 1, wherein determining that the subsequent maintenance condition has not been met comprises:
   determining that the subsequent maintenance condition is either approaching or has passed or otherwise expired.

5. The computer-implemented method of claim 1, wherein identifying the vehicle comprises:

identifying, from the vehicle information, a vehicle identification number (VIN) of the vehicle.

6. A system for compiling vehicle information, comprising:
- a communication module adapted to communicate data;
- a memory adapted to store non-transitory computer executable instructions; and
- a processor adapted to interface with the communication module, wherein the processor is (i) implemented in a central server remote from a vehicle and (ii) configured to execute the non-transitory computer executable instructions to cause the processor to:
  - receive, via the communication module, maintenance information associated with the vehicle at the central server from a service shop that serviced the vehicle, wherein the maintenance information at least indicates that a software update to an on-board operating system installed on the vehicle is available, and wherein the software update is from a manufacturer of the vehicle,
  - identify, based upon the maintenance information, (i) the vehicle, and (ii) an individual associated with the vehicle, wherein the individual has a dashboard account with the vehicle associated therewith,
  - determine a subsequent maintenance condition for the vehicle based upon the maintenance information,
  - subsequently receive, from the vehicle remote from the central server, telematics data indicating operation information of the vehicle,
  - determine, based upon the telematics data, that the subsequent maintenance condition has not been met,
  - generate a notification associated with the subsequent maintenance condition, the notification indicating a set of location-based service providers and at least one review for each of the set of location-based service providers,
  - wirelessly communicate, via the communication module, the notification to an electronic device associated with the individual,
  - identify (i) an insurance policy associated with the vehicle, and (ii) an additional vehicle that shares the insurance policy with the vehicle,
  - associate the subsequent maintenance condition with the dashboard account including the vehicle and the additional vehicle that share the insurance policy, and
  - enable the individual to access, via a user interface associated with the electronic device, the dashboard account to review information associated with the vehicle and the additional vehicle, wherein the user interface associated with the electronic device concurrently indicates (i) at least one vehicle health metric, (ii) warranty information, (iii) at least one vehicle service timeline, and (iv) at least one status trend for at least one of the vehicle and the additional vehicle.

7. The system of claim 6, wherein to identify the vehicle and the individual associated with the vehicle, the processor is configured to:
- compare the maintenance information to a listing of specific vehicles to identify the vehicle and the individual associated with the vehicle.

8. The system of claim 6, wherein to wirelessly communicate the notification to the electronic device, the processor is configured to:
- receive, from the electronic device via the communication module, an update request for the vehicle, and
- wirelessly communicate, via the communication module, the notification to the electronic device in response to receiving the update request.

9. The system of claim 6, wherein to determine that the subsequent maintenance condition has not been met, the processor is configured to:
- determine that the subsequent maintenance condition is either approaching or has passed or otherwise expired.

* * * * *